March 17, 1925.　　　　　　　　　　　　　　　1,530,273

L. McLACHLAN

DRIVING OF SHEEP SHEARING AND OTHER SMALL MACHINES

Filed July 17, 1924

Patented Mar. 17, 1925.

1,530,273

UNITED STATES PATENT OFFICE.

LACHLAN McLACHLAN, OF LONGREACH, QUEENSLAND, AUSTRALIA.

DRIVING OF SHEEP SHEARING AND OTHER SMALL MACHINES.

Application filed July 17, 1924. Serial No. 726,614.

*To all whom it may concern:*

Be it known that I, LACHLAN McLACHLAN, a subject of the King of Great Britain, residing at Longreach, in the State of Queensland, Commonwealth of Australia, shearing contractor, have invented certain new and useful Improvements in and Connected with the Driving of Sheep Shearing and Other Small Machines, of which the following is a specification.

My invention relates to the driving of sheep shearing and other like machines numbers of which are used in rows and actuated from overhead shafting.

One of the objects of this invention is the provision of means whereby a plurality of such machines may be run from one main driving pulley and one endless belt. The endless belt is arranged to pass over the pulleys of each shear driving machine. Another object of the invention is to provide for the ready cutting out and in of such machines and for the efficient mounting of the spindle for actuating the flexible shafting or other connection to the shear or machine being operated.

In the accompanying drawings, the invention is illustrated as applied to a sheep shearing machine, in which—

Figure 1:
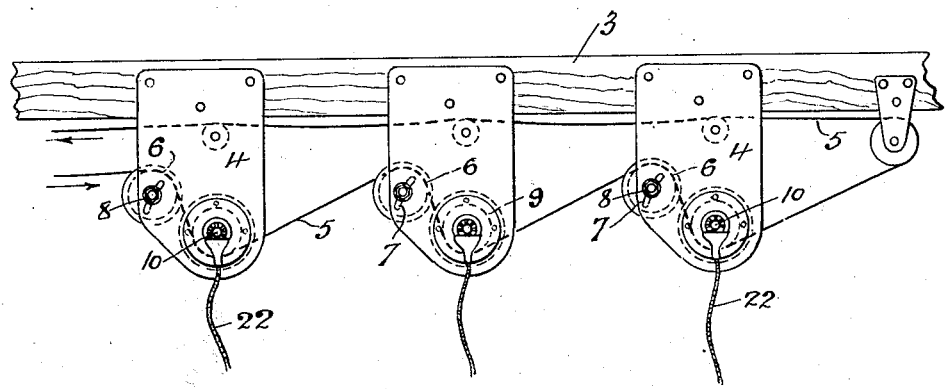
Figure 2:
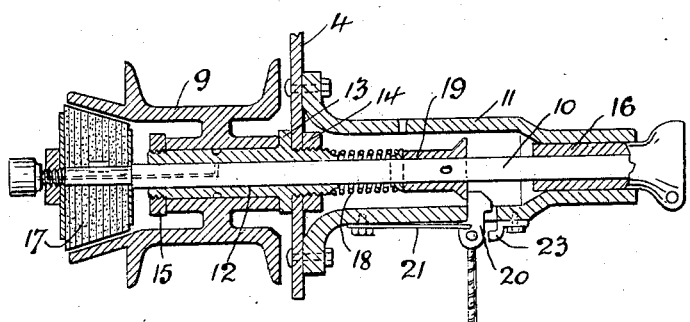

Fig. 1 is a front elevation of several spindles run from one endless belt that is shown broken and does not contain the main driving pulley, and Fig. 2 is a longitudinal sectional elevation of the shear driving means.

To an overhead beam 3 hanger plates 4 are securely bolted, there being a plate for each machine driven. The driving pulley (not shown) may also be carried on the beam and the belt 5 from the main pulley will pass over driving pulleys 6 one of which is on each hanger. The pulleys are each provided with an arc-like slot 7 by means of which they may be adjusted to alter the tension of the driving belt, in a manner like a jockey pulley, while being held on its spindle by the nut 8.

Thus, the belt 5 can be made to convey power from the main driving pulley to any reasonable number of machines and without using secondary belts.

From the pulley 6 the belt passes to the driven pulley 9 that is on the machine driving spindle 10. This spindle is coaxial with the pulley 9 and is supported in a housing 11 secured to the hanger 4. At the rear of the hanger is the sleeve 12 having outward screwed end, an inward flange 13 and a screwed projection beyond the flange that passes through the hanger and is held by a nut 14. The pulley 9 seats on the sleeve 12 and is retained thereon by a nut 15.

The sleeve also serves as a bearing to the spindle 10 that is suitably lubricated and the spindle is supported at its forward end in another sleeve 16 in the housing.

At its other end, the spindle is connected to a clutch member 17 that is adapted to engage the back of the pulley 9. In the drawing the clutch is cone-shaped and the pulley made complementary thereto. When the clutch is open the pulley 9 will be free to revolve but when closed the spindle will move with the pulley. To effect this, the forward end of the sleeve 12 is adapted to seat a compression spring 18 that is about the spindle 10, the other end of the spring seating on a stop block 19 held on the spindle. In Fig. 2, the spring 18 is shown compressed and the clutch open, the block being retained against the spring by the trip 20 that is on a flat spring 21.

Attached to the member 20 is a rope, that is pulled by the shearer to disengage the block, when the spring 18 will react to push out the block and spindle and to bring the clutch into gear with the pulley 9. The machine shear will then be driven from the spindle through the flexible shafting 22. The lower side of the housing 11 is slotted to accommodate the pivotally mounted trip 20 and in order to prevent that member being displaced too far when the spindle and block 19 are pushed inward by hand to stop the machine, a distance piece 23 is upon the housing aside the trip and against which it will come when engaged by the shoulder of the block. The inner edge of said shoulder and the outer part of the trip are made parallel to facilitate the tripping action.

Thus, simple and effective means are provided first, for running a number of small machines from one main driving pulley and belt, and second, for throwing into or out of gear the driving mechanisms of such machines.

Having now described my invention what I claim as new and desire to secure by Letters Patent is:—

1. In a sheep shear machine driving means, a plurality of hangers on a beam, a driven pulley on each hanger, a machine pulley near to and driven by a driven pulley, means for adjusting the position of the driven pulley, a shear driving spindle coaxial with the machine pulley, a clutch member on the end of each spindle and means for holding each clutch open or closed.

2. In a sheep shear machine driving means, a driving spindle operating flexible shafting to the shear, a housing to the spindle, a hanger to which the housing is secured, a sleeve attached to and passing through the hanger supporting the spindle, a machine pulley at the rear of the hanger on the sleeve, a clutch member on the spindle end and means for throwing into and out of gear said clutch and said pulley.

3. In a sheep shear machine driving means, a spindle operating flexible shafting to the shear, a housing to the spindle secured to a hanger, a sleeve about the spindle attached to and passing through the hanger, a pulley on the sleeve, a clutch device on the spindle at rear of the pulley, a block on the forward end of the spindle, a compression spring between the block and the forward or projecting end of the sleeve, a second sleeve about and supporting the outer end of the spindle and means, when the spindle is pushed inward, for retaining the spring compressed and the clutch open.

4. In a sheep shear machine driving means, a spindle operating flexible shafting to the shear and mounted in a housing so as to be susceptible of longitudinal movement therein, a driven pulley adapted to freely rotate over the rear of the spindle adjacent to a clutch member on the spindle end, a block on the spindle and a compression spring thereon adapted to be compressed by the block, a spring operated trip member that holds the block against the compression spring and a distance piece near to and below the trip member, as herein specified.

In witness whereof I affix my signature.

LACHLAN McLACHLAN.